United States Patent
Livingston et al.

(10) Patent No.: US 12,191,744 B2
(45) Date of Patent: Jan. 7, 2025

(54) CONTINUOUSLY WELDED CAPILLARY TUBING OVER INSULATED CONDUCTOR FOR ESP APPLICATIONS

(71) Applicant: Baker Hughes Holdings LLC, Houston, TX (US)

(72) Inventors: David Livingston, Claremore, OK (US); Ignacio Martinez, Tulsa, OK (US); Kendall Mohler, Claremore, OK (US)

(73) Assignee: Baker Hughes Holdings LLC, Houston, TX (US)

( * ) Notice: Subject to any disclaimer, the term of this patent is extended or adjusted under 35 U.S.C. 154(b) by 469 days.

(21) Appl. No.: 17/556,418

(22) Filed: Dec. 20, 2021

(65) Prior Publication Data
US 2023/0198335 A1 Jun. 22, 2023

(51) Int. Cl.
*H02K 5/22* (2006.01)
*H02K 15/00* (2006.01)
*H02K 15/10* (2006.01)

(52) U.S. Cl.
CPC ......... *H02K 5/225* (2013.01); *H02K 15/0062* (2013.01); *H02K 15/10* (2013.01)

(58) Field of Classification Search
CPC ..... H02K 5/225; H02K 15/0062; H02K 15/10
See application file for complete search history.

(56) References Cited

U.S. PATENT DOCUMENTS

| | | | | |
|---|---|---|---|---|
| 4,083,484 A | * | 4/1978 | Polizzano | H01B 13/0009 228/148 |
| 5,515,603 A | * | 5/1996 | Ziemek | H01B 13/2693 174/107 |
| 6,397,945 B1 | | 6/2002 | Manke et al. | |
| 6,789,318 B2 | * | 9/2004 | Frohne | B21C 37/207 72/51 |
| 7,266,886 B2 | * | 9/2007 | Estienne | H01B 13/0009 228/130 |
| 7,611,339 B2 | | 11/2009 | Tetzlaff et al. | |
| 8,931,323 B2 | * | 1/2015 | Kaminsky | B21C 37/09 72/368 |
| 9,322,245 B2 | | 4/2016 | Nicholson | |
| 9,336,929 B2 | | 5/2016 | Holzmueller et al. | |

(Continued)

FOREIGN PATENT DOCUMENTS

WO 2017205197 A1 11/2017
WO 2019110080 A1 6/2019

OTHER PUBLICATIONS

International Search Report and Written Opinion for PCT/US2022/081940 mailed Apr. 25, 2023.

*Primary Examiner* — Forrest M Phillips
(74) *Attorney, Agent, or Firm* — Baker Hughes Company

(57) ABSTRACT

A method for manufacturing a motor lead cable includes the steps of forming one or more motor leads and placing external armor around the one or motor leads. The step of forming each of the one or more motor leads includes providing an insulated conductor, providing an open capillary tube that has opposing sides that have not been joined together, placing the insulated conductor inside the unclosed capillary tube, approximating the sides of the unclosed capillary tube around the insulated conductor, and welding the sides of the capillary tube together to form a closed capillary tube around the insulated conductor.

18 Claims, 2 Drawing Sheets

(56) References Cited

U.S. PATENT DOCUMENTS

| | | |
|---|---|---|
| 9,412,502 B2 | 8/2016 | Magner |
| 10,468,159 B1 | 11/2019 | Duan et al. |
| 10,692,626 B2 | 6/2020 | Fallahmohammadi et al. |
| 10,763,011 B2 | 9/2020 | Holzmueller et al. |
| 2010/0147505 A1* | 6/2010 | Manke .................. H01B 3/306 166/66.4 |
| 2015/0184790 A1 | 7/2015 | Baker et al. |
| 2016/0141076 A1* | 5/2016 | Perego .................... H01B 1/02 427/455 |
| 2017/0184804 A1* | 6/2017 | Lowell .................. G02B 6/443 |
| 2019/0234155 A1 | 8/2019 | Mack et al. |
| 2020/0211733 A1 | 7/2020 | Milouchev et al. |
| 2020/0243218 A1 | 7/2020 | Goertzen et al. |
| 2020/0265972 A1 | 8/2020 | Glasscock et al. |
| 2021/0313092 A1 | 10/2021 | Grabinsky et al. |

* cited by examiner

CONTINUOUSLY WELDED CAPILLARY TUBING OVER INSULATED CONDUCTOR FOR ESP APPLICATIONS

FIELD OF THE INVENTION

The present invention relates generally to electric submersible pumping systems and more particularly to the construction of electric conductors used in downhole electric submersible pumping systems.

BACKGROUND

Submersible pumping systems are often deployed into wells to recover petroleum fluids from subterranean reservoirs. Typically, a submersible pumping system includes a number of components, including an electric motor coupled to one or more high performance pump assemblies. Production tubing is connected to the pump assemblies to deliver the petroleum fluids from the subterranean reservoir to a storage facility on the surface.

The motor is typically an oil-filled, high capacity electric motor that can vary in length from a few feet to nearly one hundred feet, and may be rated up to hundreds of horsepower. Typically, electricity is generated on the surface and supplied to the motor through a heavy-duty power cable. The power cable typically includes several separate conductors that are individually insulated within the power cable. Power cables are often constructed in round or flat configurations.

In many applications, power is conducted from the power cable to the motor via a "motor lead cable." The motor lead cable typically includes one or more "leads" that are configured for connection to a mating receptacle on the motor. The leads from the motor lead cable are often retained within a motor-connector that is commonly referred to as a "pothead." The pothead relieves the stress or strain realized between the motor and the leads from the motor lead cable. Motor lead cable is often constructed in a "flat" configuration for use in the limited space between downhole equipment and the well casing.

Because the power and motor lead cables are positioned in the annulus between the production string and well casing, these cables must be designed to withstand the inhospitable downhole environment. Prior art cables often fail over time as the protective sheathing fails and corrosive well fluids degrade the various layers of insulation placed around the electrical conductors. Without sufficient protection, the high-capacity power and motor lead cables become susceptible to electrical malfunctions that cause irreparable damage to the cable and downhole equipment.

Power and motor lead cables typically include a conductor, insulation surrounding the conductor, a lead-based sheathing that covers the insulation, and a durable external armor that surrounds the sheathing. Lead-based sheathing is not typically indicated for service in environments with extreme concentrations of hydrogen sulfide ("sour" applications). Lead is a soft metal and is easily damaged during manufacturing, assembly or installation. If the lead sheathing is damaged, the insulator and copper conductor may be subject to accelerated corrosion and failure. Additionally, lead can be toxic to humans and animals and is associated with a number of health and safety concerns. Additionally, lead is heavy and increases the costs associate with manufacturing, packaging, shipping, and handling.

As an alternative to lead-based sheathing, manufacturers have attempted to use steel-based capillary tubing as protective jacket around the insulated conductors. Conventional capillary tubing is produced as a seamless extruded tube through which the conductor and insulation layers must be pulled. The frictional interface between the insulated conductor and conventional capillary tubing frustrates efforts to encapsulate longer conductors within the closed capillary tubing. This prevents the use of capillary tubing sheathing for all but the shortest motor lead cables. Accordingly, there is a need for an improved cable design for use in power and motor lead cables that provides adequate resistance from $H_2S$ and other corrosive compounds in downhole environments. It is to these and other deficiencies in the prior art that exemplary embodiments of the present invention are directed.

SUMMARY OF THE INVENTION

In one aspect, embodiments of the present invention include a method for manufacturing a motor lead cable, where the method includes the steps of forming one or more motor leads and placing external armor around the one or motor leads. The step of forming each of the one or more motor leads includes providing an insulated conductor, providing an open capillary tube that has opposing sides that have not been joined together, placing the insulated conductor inside the unclosed capillary tube, approximating the sides of the unclosed capillary tube around the insulated conductor, and welding the sides of the capillary tube together to form a closed capillary tube around the insulated conductor.

In another aspect, embodiments of the present invention include a method for forming a motor lead for use in a motor lead cable or power cable. The method includes the steps of providing an insulated conductor, providing an open capillary tube that has opposing sides that have not been joined together, placing the insulated conductor inside the unclosed capillary tube, approximating the sides of the unclosed capillary tube around the insulated conductor, and welding the sides of the capillary tube together to form a closed capillary tube around the insulated conductor.

In yet another aspect, embodiments of the present invention include a cable for conducting power to an electric submersible pumping system. In this embodiment, the cable includes a plurality of motor leads and external armor that surrounds the plurality of motor leads. Each of the plurality of motor leads includes a conductor, an insulator surrounding the conductor, and a capillary tube surrounding the insulator. The capillary tube includes a seam from closing the capillary tube around the insulator.

WRITTEN DESCRIPTION

Figure 1:
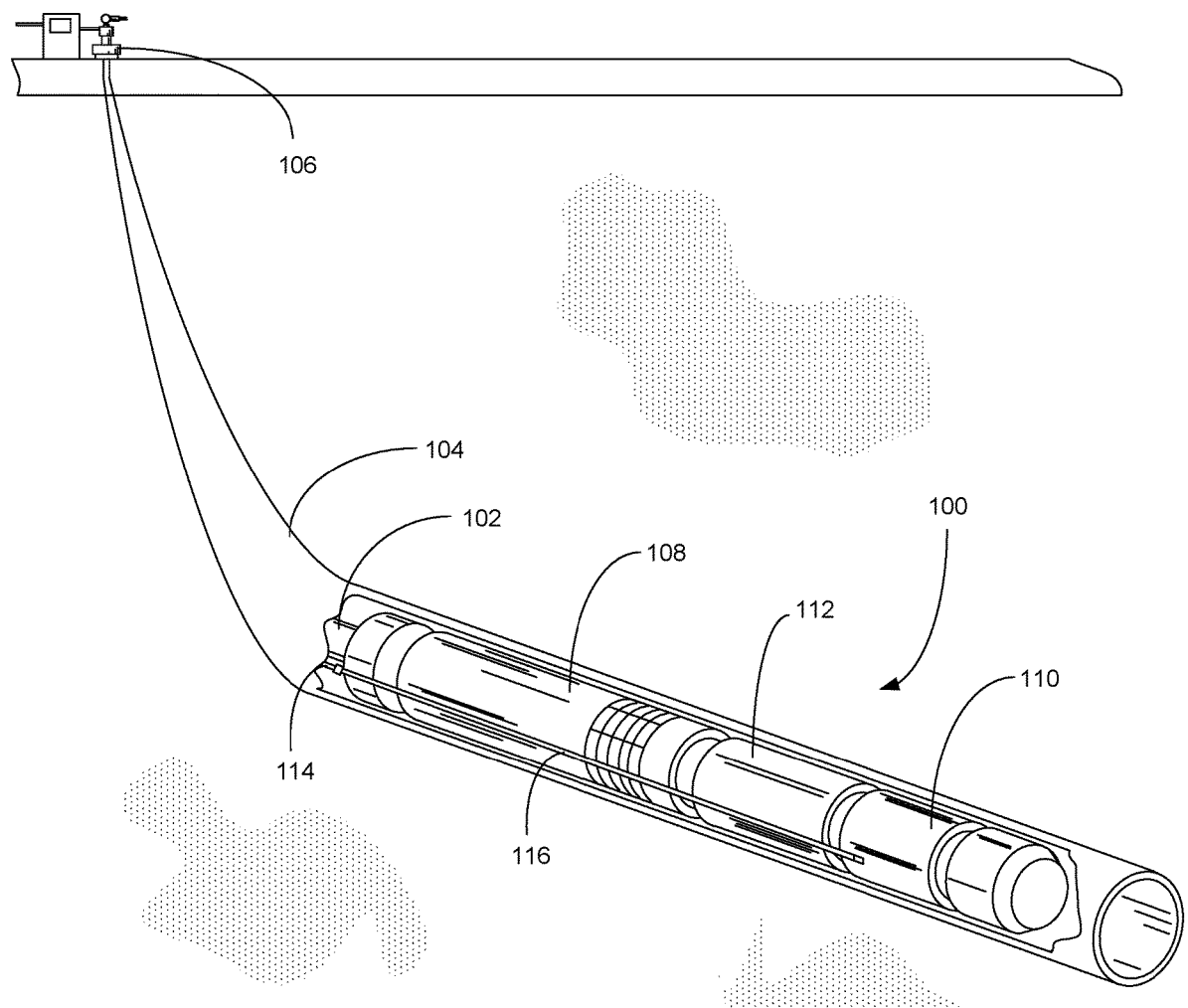
FIG. 1 is a back view of a downhole pumping system constructed in accordance with an embodiment of the present invention.

In accordance with an exemplary embodiment of the present invention, FIG. 1 shows a front perspective view of a downhole pumping system 100 attached to production tubing 102. The downhole pumping system 100 and production tubing 102 are disposed in a wellbore 104, which is drilled for the production of a fluid such as water or petroleum. The downhole pumping system 100 is shown in a non-vertical well. This type of well is often referred to as a "horizontal" well. Although the downhole pumping system 100 is depicted in a horizontal well, it will be appreciated that the downhole pumping system 100 can also be used in vertical wells.

As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system 100 are primarily disclosed in a submersible application, some or all of these components can also be used in surface pumping operations. It will be further understood that the pumping system 100 is well-suited for use in high-temperature applications, including steam-assisted gravity drainage (SAGD) applications, where downhole temperatures may exceed 250° C., or where the concentration of hydrogen sulfide ($H_2S$) gas is high.

The pumping system 100 includes a pump 108, a motor 110 and a seal section 112. The motor 110 is an electric motor that receives its power from a surface-based supply through a power cable 114 and motor lead cable 116. In many embodiments, the power cable 114 and motor lead cable 116 are each configured to supply the motor 110 with three-phase electricity from a surface-based variable speed (or variable frequency) drive 118. As used herein, the generic reference to "cable" refers to both the power cable 114 and the motor lead cable 116.

The motor 110 converts the electrical energy into mechanical energy, which is transmitted to the pump 108 by one or more shafts. The pump 108 then transfers a portion of this mechanical energy to fluids within the wellbore, causing the wellbore fluids to move through the production tubing 102 to the surface. In some embodiments, the pump 108 is a turbomachine that uses one or more impellers and diffusers to convert mechanical energy into pressure head. In other embodiments, the pump 108 is a progressive cavity (PC) or positive displacement pump that moves wellbore fluids with one or more screws or pistons.

The seal section 112 shields the motor 110 from mechanical thrust produced by the pump 108. The seal section 112 is also configured to prevent the introduction of contaminants from the wellbore 104 into the motor 110. Although only one pump 108, seal section 112 and motor 110 are shown, it will be understood that the downhole pumping system 100 could include additional pumps 108, seal sections 112 or motors 110.

Figure 2:
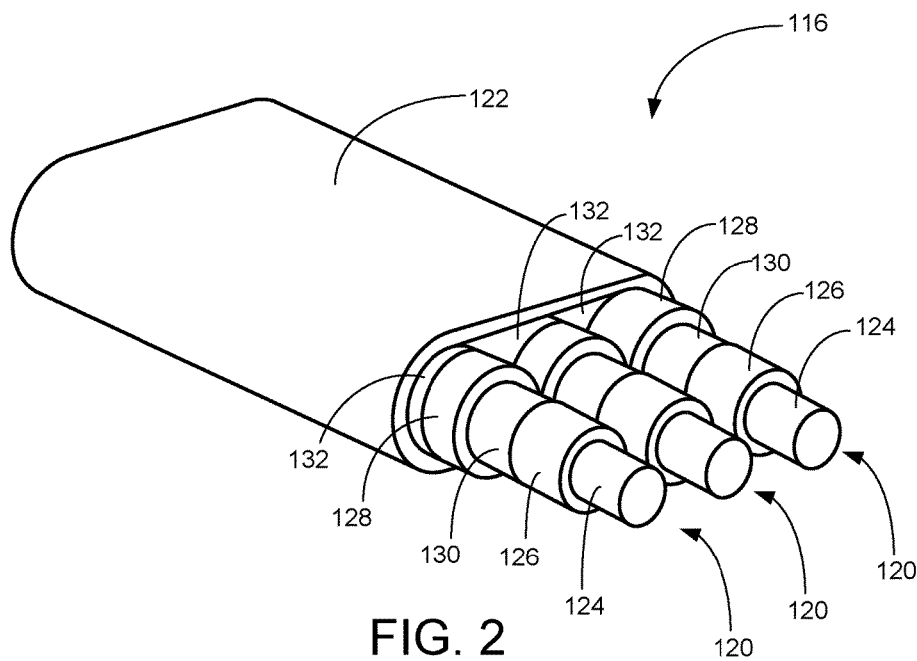
FIG. 2 is a perspective view of the motor lead cable of the downhole pumping system of FIG. 1.
Figure 3:
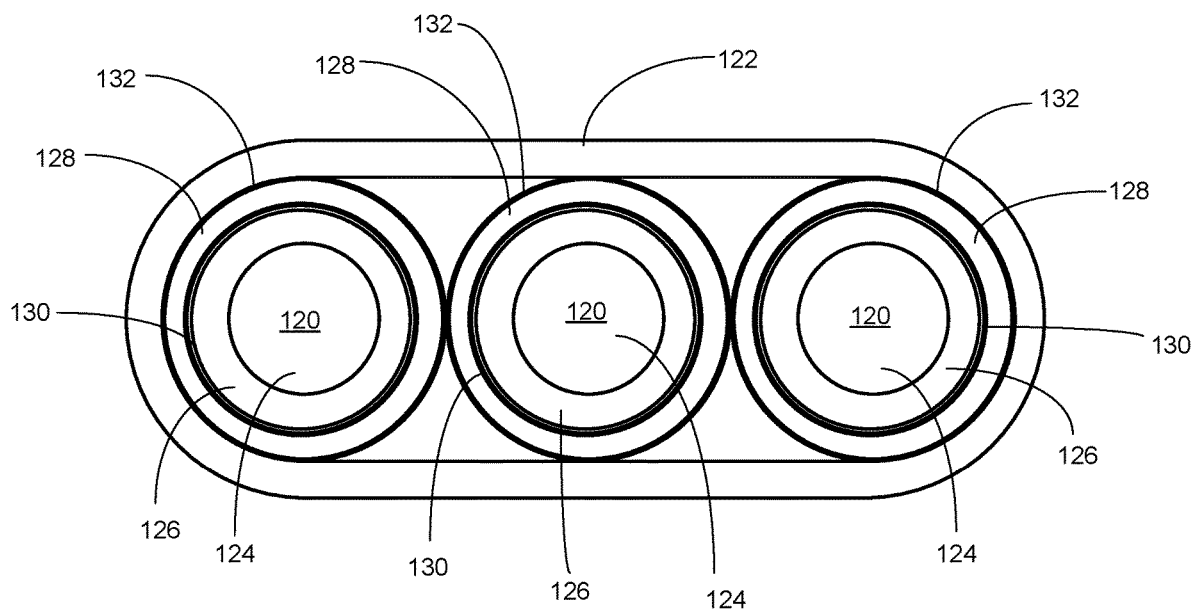
FIG. 3 is a cross-sectional view of the motor lead cable of FIG. 2.

Referring now to FIGS. 2 and 3, shown therein are perspective and cross-sectional views, respectively, of a portion of the motor lead cable 116. It will be understood that the geometric configuration of the motor lead cable 116 can be selected on an application specific basis. Generally, flat cable configurations, as shown in FIG. 2, are used in applications where there is a limited amount of annular space around the pumping system 100 in the wellbore 104. In other embodiments, the motor lead cable 116 can have a round or triangular cross-section if the conductors are presented as stacked rather than flat. Although the embodiments depicted in FIGS. 2 and 3 are directed at the motor lead cable 116, it will be appreciated that the same configuration and methods of manufacture can be applied equally to the manufacture of power cables 114.

In the exemplary embodiments depicted in FIGS. 2 and 3, the motor lead cable 116 includes one or more leads 120 that are collectively gathered and protected by external armor 122. At least one of the leads 120 includes a conductor 124, an insulator 126 surrounding the conductor 124, and a capillary tube 128 surrounding the insulator 126. In the embodiment depicted in FIGS. 2 and 3, one or more of the leads 120 further include a barrier layer 130 between the capillary tube 128 and the insulator 126. In some embodiments, one or more of the leads 120 also includes a bedding tape layer 132 between the external armor 122 and the capillary tube 128. As depicted in FIGS. 2 and 3, each of the leads 120 has the same construction and includes the insulator 126, the capillary tube 128, the barrier layer 130, and the bedding tape layer 132 between the capillary tube 128 and the external armor 122.

In exemplary embodiments, the conductors 124 are manufactured from copper and may include a solid core (as shown in FIGS. 2 and 3), a stranded core, or a stranded exterior surrounding a solid core. The armor 122 can be manufactured from galvanized steel, stainless steel, Monel or other suitable metal or composite material.

The insulators 126 are configured to electrically isolate the conductors 124, while providing increased resistance to $H_2S$ and other corrosive or oxidative compounds potentially present in the wellbore 104. The insulator 126 may include one or more layers of one or more polymers that exhibit excellent properties for providing electrical insulation and resistance to hydrogen sulfide and other corrosive compounds. The barrier layer 130 can be constructed from a fluid-impermeable polymer that prevents water and other wellbore fluids from contacting the insulator 126. Suitable polymers for the insulator 126 and barrier layer 130 include EPDM, PP/EPDM, polyarylether ketone (PAEK), polyether ether ketone (PEEK), polyether ketone ketone (PEKK), perfluoroalkoxy polymer (PFA), fluoroplastics, and other high-temperature polymers.

The insulator 126 and the barrier layer 130 may be constructed from different materials. The bedding tape layer 132 ensures a good fit between each lead 120 and the external armor 122 and reduces any movement or vibration between the leads 120 and the armor 122. As used herein, the term "insulated conductor 134" refers to the conductor 124, the single or multilayered insulator 126, and the optional barrier layer 130.

Unlike the prior art capillary tubing used as sheathing in motor lead cables, the capillary tube 128 is provided as an unclosed tube with a flat or arcuate cross section that can be closed by approximating and then joining together the edges of the capillary tube 128. In exemplary embodiments, the open capillary tube 128 is closed by bending the side edges into proximity with one another and then welding the edges together to produce a closed capillary tube 128 with a continuous seam. This allows the insulated conductor 134 to be laterally placed into the open (unwelded) capillary tube 128, which can then be approximated around the insulated conductor 134, and then continuously welded together to form a fluid impermeable enclosure around the insulated conductor 134. This avoids the prior art problems associated with pulling the insulated conductor 134 through the conventional extruded capillary tubing.

Once the entire length of the insulator 126 and conductor 124 have been placed into the open capillary tube 128, the sides of the open capillary tube 128 can be approximated and sealed together through the continuous welding process. In exemplary embodiments, the capillary tube 128 is closed and then welded in a rolling, progressive process such that a leading end of the open capillary tube 128 is closed and welded before a trailing end of the open capillary tube 128 is closed. In other embodiments, the entire length of the open capillary tube 128 is first closed before the continuous welding process begins to close the capillary tube 128 around the insulator 126.

Thus, one method of constructing the motor lead cable 116 begins with constructing the leads 120. Each lead 120 can be constructed by procuring or manufacturing the insulated conductor 134 through commercially available processes in which the insulator 126 and barrier layer 130 are extruded, wrapped or otherwise affixed around the conductor 124. Next, the insulated conductor 134 is placed into the open capillary tube 128. The length of the open capillary tube 128 can be selected to match the desired length of the lead 120, without concern for whether a particular length of the insulated conductor 134 could be successfully pulled through a conventional capillary tube.

Once the insulated conductor 134 has been placed into the open capillary tube 128, the sides of the open capillary tube 128 can be approximated together. The sides of the open capillary tube 128 can be held in the approximated position with an external vice, clamp, crimping device, or other fixture. In exemplary embodiments, the open capillary tube 128 applies a compressive force to the insulated conductor 134 when the sides of the open capillary tube 128 are approximated.

Next, the approximated sides of the open capillary tube 128 are welded together through a continuous welding process to form a weld seam that closes the capillary tube 128 around the insulated conductor. In some embodiments, the entire length of the capillary tube 128 is welded in a continuous pass using automated welding machines to ensure that the capillary tube 128 is properly welded without causing damage to the insulated conductor 134. In other embodiments, the sides of the leading end of the open capillary tube 128 are wrapped around the insulated conductor in a progressive fashion along the length of the motor lead 120 and the sides of the leading end of the capillary tube 128 are welded together before the trailing end of the capillary tube 128 has been closed around the insulated conductor 134. Again, automated welding machines can be used to perform the process of sequentially closing and welding the open capillary tube 128 around the insulated conductor 134.

In some embodiments, the barrier layer 130 is manufactured from a heat-expandable material that expands or "foams" when exposed to heat. The heat-expandable material selected for the barrier layer 130 can be selected from suitable thermoplastic resins, whether fluorinated or not. In some embodiments, the barrier layer 130 includes a heat-expandable perfluoroalkoxy polymer (PFA), which provides excellent resistance under high temperatures. Other embodiments include the use of foamable fluorinated ethylene propylene (FEP) or foamable polypropylene.

If a foamable material is selected for the optional barrier layer 130, the foamable material is first extruded in an unexpanded form over the insulator 126. The insulated conductor 134 with the foamable barrier layer 130 is then placed into the open capillary tube 128. The capillary tube 128 is then closed and sealed as set forth above. In some embodiments, the heat produced by the continuous welding process is sufficient to activate the barrier layer 130 and cause the foamable material to expand within the capillary tube 128. In other embodiments, a separate heat source is applied to the closed and sealed capillary tube 128 to activate the expandable barrier layer 130. In each case, the heat-activation of the barrier layer 130 causes the foamable material to expand within the closed capillary tube 128 to fill any voids between the insulator 126 and the capillary tube 128. This increases the thermal, mechanical and electrical resistance of each motor lead 120.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A method for manufacturing a motor lead cable, the method comprising the steps of:
   forming one or more motor leads, wherein the step of forming each of the one or more motor leads comprises:
   providing an insulated conductor;
   enclosing the insulated conductor with a foamable barrier layer constructed from a heat-expandable material;
   providing an open capillary tube that has opposing sides that have not been joined together;
   placing the insulated conductor and barrier layer inside the unclosed capillary tube;
   approximating the sides of the unclosed capillary tube around the insulated conductor; and
   welding the sides of the capillary tube together to form a closed capillary tube around the insulated conductor; and
   placing external armor around the one or motor leads.

2. The method of claim 1, wherein the step of providing an insulated conductor comprises providing a conductor surrounded by one or more layers of fluoroplastics insulation.

3. The method of claim 1, wherein the step of providing an insulated conductor comprises providing a conductor surrounded by one or more insulator layers selected from the group consisting of EPDM, PP/EPDM, polyarylether ketone (PAEK), polyether ether ketone (PEEK), polyether ketone ketone (PEKK), and perfluoroalkoxy polymer (PFA).

4. The method of claim 1, further comprising the step of applying heat to the barrier layer during the welding step to cause the heat-expandable material to expand within the closed capillary tube.

5. The method of claim 1, wherein the method further comprises the step of applying heat to the barrier layer after the step of welding the sides of the capillary tube together to cause the heat-expandable material to expand within the closed capillary tube.

6. The method of claim 1, wherein the steps of approximating the sides of the unclosed capillary tube around the insulated conductor and welding the sides of the capillary tube together to form a closed capillary tube around the insulated conductor take place on a rolling basis in which the sides of a leading end of the capillary tube are welded together before the sides of a trailing end of the capillary tube are approximated.

7. The method of claim 1, wherein the steps of approximating the sides of the unclosed capillary tube around the insulated conductor and welding the sides of the capillary tube together to form a closed capillary tube around the insulated conductor take place separately such that the sides of an entire length of the capillary tube are approximated before the sides of the capillary tube are welded together.

8. A method for forming a motor lead for use in a motor lead cable or power cable, wherein the method comprises the steps of:
   providing an insulated conductor;
   providing an open capillary tube that has opposing sides that have not been joined together;
   placing the insulated conductor inside the unclosed capillary tube;
   approximating the sides of the unclosed capillary tube around the insulated conductor to exert a compressive force on the insulated conductor; and
   welding the sides of the capillary tube together to form a closed capillary tube around the insulated conductor.

9. The method of claim 8, wherein the step of placing the insulated conductor inside the unclosed capillary tube comprises laterally placing the insulated conductor inside the unclosed capillary tube.

10. The method of claim 9, wherein the step of providing an insulated conductor comprises providing a conductor surrounded by one or more layers of fluoroplastics insulation.

11. The method of claim 9, wherein the step of providing an insulated conductor comprises providing a conductor surrounded by one or more insulator layers selected from the group consisting of EPDM, PP/EPDM, polyarylether ketone (PAEK), polyether ether ketone (PEEK), polyether ketone ketone (PEKK), and perfluoroalkoxy polymer (PFA).

12. The method of claim 8, further comprising the step of enclosing the insulated conductor with a barrier layer before the insulated conductor is placed into the open capillary tube.

13. The method of claim 8, wherein the steps of approximating the sides of the unclosed capillary tube around the insulated conductor and welding the sides of the capillary tube together to form a closed capillary tube around the insulated conductor take place on a rolling basis in which the sides of a leading end of the capillary tube are welded together before the sides of a trailing end of the capillary tube are approximated.

14. The method of claim 8, wherein the steps of approximating the sides of the unclosed capillary tube around the insulated conductor and welding the sides of the capillary tube together to form a closed capillary tube around the insulated conductor take place separately such that the sides of an entire length of the capillary tube are approximated before the sides of the capillary tube are welded together.

15. A cable for conducting power to an electric submersible pumping system, the cable comprising:
   a plurality of motor leads, wherein each of the plurality of motor leads comprises:
      a conductor;
      an insulator surrounding the conductor;
      a capillary tube surrounding the insulator, wherein the capillary tube includes a seam from closing the capillary tube around the insulator; and
      a heat-expanded barrier layer between the capillary tube and the insulator; and
   external armor that surrounds the plurality of motor leads.

16. The cable of claim 15, wherein the heat-expanded barrier layer comprises a foamable perfluoroalkoxy polymer (PFA).

17. The cable of claim 15, wherein the cable further comprises a bedding layer between each of the plurality of motor leads and the external armor.

18. The cable of claim 15, wherein The method of claim 9, wherein the insulator comprises one or more insulator layers selected from the group consisting of EPDM, PP/EPDM, polyarylether ketone (PAEK), polyether ether ketone (PEEK), polyether ketone ketone (PEKK), and perfluoroalkoxy polymer (PFA).

* * * * *